United States Patent
Kawai

(10) Patent No.: US 10,735,680 B2
(45) Date of Patent: Aug. 4, 2020

(54) INFRARED IMAGING DEVICE, FIXED PATTERN NOISE CALCULATION METHOD, AND FIXED PATTERN NOISE CALCULATION PROGRAM

(71) Applicant: FUJIFILM Corporation, Tokyo (JP)

(72) Inventor: Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 348 days.

(21) Appl. No.: 15/435,923

(22) Filed: Feb. 17, 2017

(65) Prior Publication Data

US 2017/0163919 A1 Jun. 8, 2017

Related U.S. Application Data

(63) Continuation of application No. PCT/JP2015/063797, filed on May 13, 2015.

(30) Foreign Application Priority Data

Sep. 29, 2014 (JP) ................................ 2014-199015

(51) Int. Cl.
*H04N 5/365* (2011.01)
*H04N 5/33* (2006.01)
(Continued)

(52) U.S. Cl.
CPC .............. *H04N 5/365* (2013.01); *G01J 1/42* (2013.01); *H04N 5/23293* (2013.01); *H04N 5/33* (2013.01); *H04N 5/3675* (2013.01)

(58) Field of Classification Search
CPC .. H04N 5/365; H04N 5/3675; H04N 5/23293; H04N 5/33; G01J 1/42
See application file for complete search history.

(56) References Cited

U.S. PATENT DOCUMENTS 7,035,475 B1 * 4/2006 Chen ...................... H04N 5/365
348/E5.081
2006/0279632 A1 12/2006 Anderson
(Continued)

FOREIGN PATENT DOCUMENTS

CN 1917590 A 2/2007
CN 102415091 A 4/2012
(Continued)

OTHER PUBLICATIONS

International Search Report (PCT/ISA/210) issued in PCT/JP2015/063797, dated Jul. 14, 2015.
(Continued)

*Primary Examiner* — Joseph W Becker
(74) *Attorney, Agent, or Firm* — Birch, Stewart, Kolasch & Birch, LLP

(57) ABSTRACT

An infrared imaging device includes an imaging element including a plurality of infrared detection pixels which are two-dimensionally arranged and an FPN calculation unit that selects a plurality of selected captured image data items from a plurality of captured image data items obtained by capturing an image of an object including a moving body, which moves with respect to the imaging element, using the imaging element, averages the plurality of selected captured image data items to generate average image data, and stores the average image data as fixed pattern noise which is output from the plurality of infrared detection pixels.

16 Claims, 7 Drawing Sheets

(51) Int. Cl.
*G01J 1/42* (2006.01)
*H04N 5/367* (2011.01)
*H04N 5/232* (2006.01)

(56) References Cited

U.S. PATENT DOCUMENTS

| | | | |
|---|---|---|---|
| 2007/0110331 A1 | 5/2007 | Satoh | |
| 2008/0056606 A1* | 3/2008 | Kilgore | F41G 7/2213 382/275 |
| 2012/0274779 A1 | 11/2012 | Tanaka et al. | |
| 2014/0139685 A1* | 5/2014 | Nussmeier | H04N 5/2257 348/164 |

FOREIGN PATENT DOCUMENTS

| | | |
|---|---|---|
| CN | 102761747 A | 10/2012 |
| CN | 103875235 A | 6/2014 |
| JP | 2-046072 A | 2/1990 |
| JP | 2001-153723 A | 6/2001 |
| JP | 2006-140982 A | 6/2006 |
| JP | 2009-49953 A | 3/2009 |
| JP | 2009-089138 A | 4/2009 |
| WO | WO 2010/101786 A1 | 9/2010 |
| WO | WO 2012/170949 A2 | 12/2012 |

OTHER PUBLICATIONS

Written Opinion (PCT/ISA/237) issued in PCT/JP2015/063797, dated Jul. 14, 2015.
English translation of Written Opinion of the International Searching Authority issued in PCT/JP2015/063797 dated Jul. 14, 2015 (Form PCT/ISA/237).
Chinese Office Action and Search Report, dated Jun. 5, 2019, for corresponding Chinese Application No. 201580052803.4, with an English translation.
Chinese Office Action and English translation for corresponding Chinese Application No. 201580052803.4, dated Apr. 2, 2020.

* cited by examiner

INFRARED IMAGING DEVICE, FIXED PATTERN NOISE CALCULATION METHOD, AND FIXED PATTERN NOISE CALCULATION PROGRAM

CROSS REFERENCE TO RELATED APPLICATION

This is a continuation of International Application No. PCT/JP2015/063797 filed on May 13, 2015, and claims priority from Japanese Patent Application No. 2014-199015 filed on Sep. 29, 2014, the entire disclosures of which are incorporated herein by reference.

BACKGROUND OF THE INVENTION

1. Field of the Invention

The present invention relates to an infrared imaging device, a fixed pattern noise calculation method, and a computer readable medium storing a fixed pattern noise calculation program.

2. Description of the Related Art

In the related art, in an infrared imaging device, fixed pattern noise (hereinafter, abbreviated to FPN) unique to the device, such as a variation in the sensitivity of an infrared detection pixel or a variation in the gain and offset of a circuit, occurs. In particular, in an infrared imaging device including an imaging element in which infrared detection pixels are two-dimensionally arranged, since the characteristics of each infrared detection pixel vary, FPN that changes for a relatively long period of time occurs.

When FPN occurs in the infrared imaging device, it is difficult to capture an image with uniform brightness (density) even if a surface with a uniform temperature is captured. Therefore, a shutter is provided in an infrared imaging device and a process which calculates FPN in a state in which light incident on infrared detection pixels from the outside is shielded and corrects the FPN is performed (for example, see JP2009-089138A).

JP2006-140982A discloses a technique that is not related to an infrared imaging device and performs FPN correction in an imaging device.

JP2006-140982A discloses an imaging device that overlaps a plurality of captured image data items obtained while a moving image is being captured and extracts high-frequency components from the overlapped captured image data with a filter to calculate FPN.

JP1990-046072A (JP-H02-046072A) discloses a method which calculates a continuous function that gives a value close to the average of a plurality of captured image data items with uniform brightness and subtracts the continuous function from the average to correct FPN.

SUMMARY OF THE INVENTION

As disclosed in JP2009-089138A, in the method which calculates FPN in a state in which the shutter is closed, while the infrared imaging device is operating, the shutter is periodically closed. Therefore, while a moving image is being captured, the captured moving image is periodically interrupted.

The imaging device disclosed in JP2006-140982A can calculate FPN, without closing the shutter. However, the imaging device disclosed in JP2006-140982A is configured to capture visible light. Even if the method disclosed in JP2006-140982A is applied to an infrared imaging device, it is difficult to sufficiently correct FPN.

That is, FPN of the infrared imaging device is not limited to high-frequency components and there is FPN other than the high-frequency components. Therefore, when the method disclosed in JP2006-140982A is applied to an infrared imaging device, it is difficult to remove FPN other than high-frequency components and to sufficiently improve the quality of a captured image.

The method disclosed in JP1990-046072A (JP-H02-046072A) needs to obtain a plurality of captured image data items with uniform brightness and is not capable of being applied to capture a moving image.

The invention has been made in view of the above-mentioned problems and an object of the invention is to provide an infrared imaging device, a fixed pattern noise calculation method, and a computer readable medium storing a fixed pattern noise calculation program that can calculate FPN with high accuracy while capturing a moving image without any interruption.

An infrared imaging device according to the invention comprises: an imaging element including a plurality of infrared detection pixels which are two-dimensionally arranged; and a fixed pattern noise calculation unit that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels.

A fixed pattern noise calculation method according to the invention comprises a fixed pattern noise calculation step of selecting a plurality of selected captured image data items from a plurality of captured image data items obtained by capturing an image of an object including a moving body, which moves with respect to an imaging element including a plurality of infrared detection pixels that are two-dimensionally arranged, using the imaging element, averaging at least a portion of each of the plurality of selected captured image data items to generate average image data, and storing the average image data as fixed pattern noise which is output from at least some of the plurality of infrared detection pixels.

A fixed pattern noise calculation program according to the invention causes a computer to perform a fixed pattern noise calculation step of selecting a plurality of selected captured image data items from a plurality of captured image data items obtained by capturing an image of an object including a moving body, which moves with respect to an imaging element including a plurality of infrared detection pixels that are two-dimensionally arranged, using the imaging element, averaging at least a portion of each of the plurality of selected captured image data items to generate average image data, and storing the average image data as fixed pattern noise which is output from at least some of the plurality of infrared detection pixels.

According to the invention, it is possible to provide an infrared imaging device, a fixed pattern noise calculation method, and a fixed pattern noise calculation program that can calculate FPN with high accuracy while capturing a moving image without any interruption.

DESCRIPTION OF THE PREFERRED EMBODIMENTS

Hereinafter, an embodiment of the invention will be described with reference to the drawings.

Figure 1:
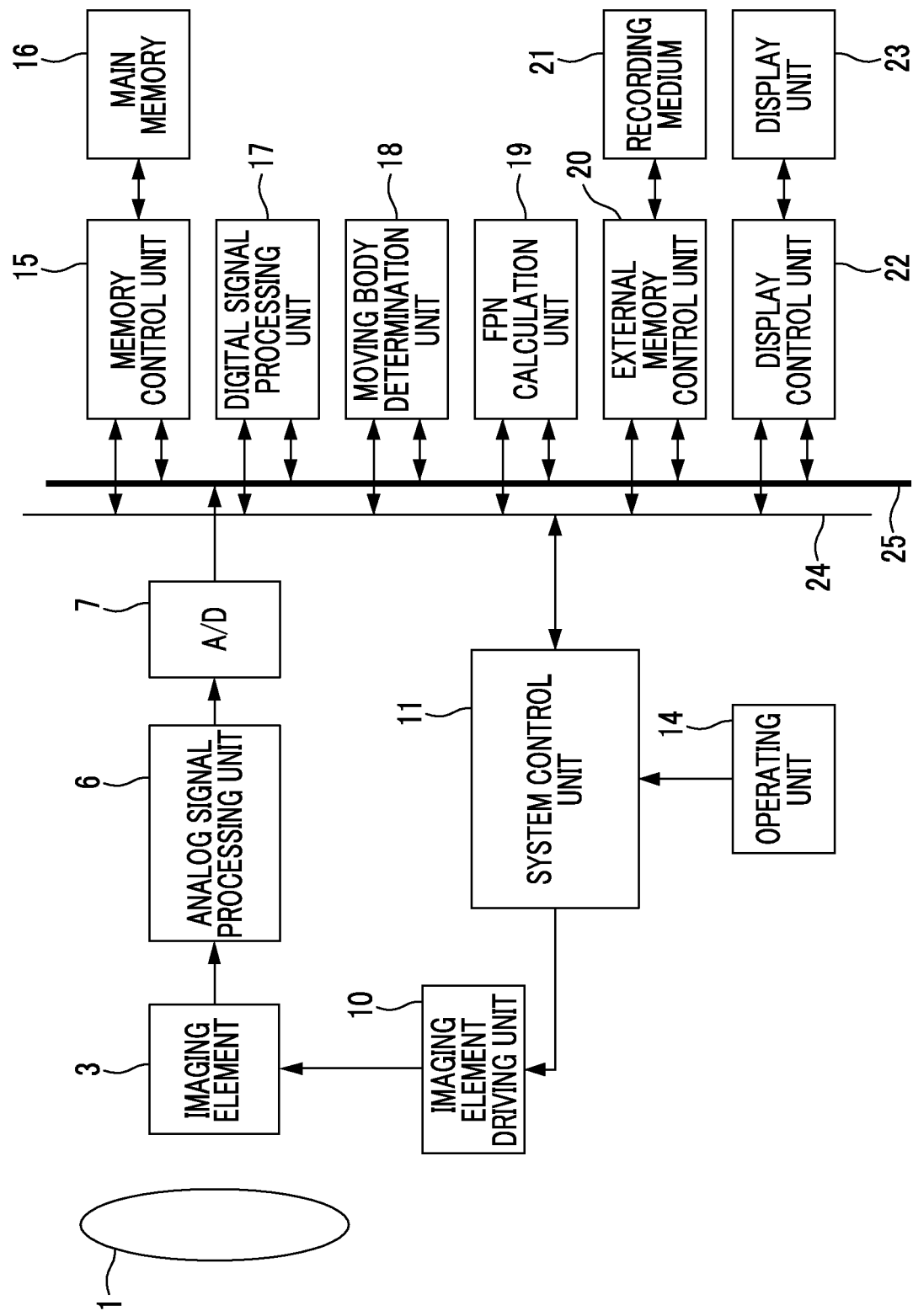
FIG. 1 is a diagram schematically illustrating the structure of an infrared imaging device for describing an embodiment of the invention.

FIG. 1 is a diagram schematically illustrating the structure of an infrared imaging device for describing an embodiment of the invention.

The infrared imaging device illustrated in FIG. 1 comprises an imaging lens 1, an imaging element 3 that captures an image of an object through the imaging lens 1, an analog signal processing unit 6, an analog/digital conversion circuit (A/D conversion circuit) 7, and an imaging element driving unit 10.

The imaging element 3 includes a plurality of infrared detection pixels which are two-dimensionally arranged and detect infrared rays (in general, light with a wavelength of 8 μm to 12 μm) that have been emitted from the object and focused through the imaging lens 1. The imaging element 3 is driven by the imaging element driving unit 10.

A pyroelectric element is given as an example of an infrared detection element used in the infrared detection pixel. Alternatively, a thermopile-type infrared detection element in which thermocouples generating the Seebeck effect are connected or a bolometer-type infrared detection element using a change in a resistance value caused by a temperature rise may be used.

The infrared detection element is not limited to the above and any type of infrared detection element may be used as long as it can detect infrared rays. In the specification, a set of pixel signals output from all of the infrared detection pixels of the imaging element 3 is referred to as captured image data.

The analog signal processing unit 6 performs analog signal processing including an amplification process of multiplying each pixel signal value of the captured image data output from the imaging element 3 by the gain to amplify the captured image data.

The A/D conversion circuit 7 converts analog captured image data output from the analog signal processing unit 6 into digital data.

The analog signal processing unit 6, the A/D conversion circuit 7, and the imaging element driving unit 10 are controlled by a system control unit 11.

An instruction signal is input from the user to the system control unit 11 through an operating unit 14.

In addition, the electric control system of the infrared imaging device comprises a main memory 16, a memory control unit 15 connected to the main memory 16, a digital signal processing unit 17 that performs, for example, a process of converting the captured image data output from the A/D conversion circuit 7 into a format which can be displayed by a display unit 23, a moving body determination unit 18 that determines whether a moving body (moving object) is included in the captured image data obtained by the imaging element 3, an FPN calculation unit 19 that calculates FPN output from the infrared detection pixels of the imaging element 3, an external memory control unit 20 to which a detachable and attachable recording medium 21 is connected, and a display control unit 22 to which the display unit 23 is connected.

The memory control unit 15, the digital signal processing unit 17, the FPN calculation unit 19, the external memory control unit 20, and the display control unit 22 are connected to each other by a control bus 24 and a data bus 25 and are controlled by instructions from the system control unit 11.

The moving body determination unit 18 performs a process (for example, a pattern matching process) of comparing a plurality of captured image data items, which are obtained by the imaging element 3 and are arranged in time series, to detect a moving body from the captured image data. When a moving body is detected, the moving body determination unit 18 determines that the moving body is included in the captured image data.

The FPN calculation unit 19 selects a plurality of selected captured image data items from a plurality of captured image data items obtained by capturing an image of an object including a moving body, which moves with respect to the imaging element 3, among captured image data items obtained by the imaging element 3 for a predetermined period of time. The FPN calculation unit 19 averages at least a portion of each of the plurality of selected captured image data items to generate average image data and stores the average image data as FPN output from at least some of the plurality of infrared detection pixels of the imaging element 3 in an FPN storage area of the main memory 16.

Specifically, the FPN calculation unit 19 averages data in the moving range of the moving body in each of the plurality of selected captured image data items to generate average image data, for the plurality of selected captured image data items. The FPN calculation unit 19 stores the average image data as the FPN of the infrared detection pixels corresponding to the moving range in the FPN storage area of the main memory 16.

Figure 2:
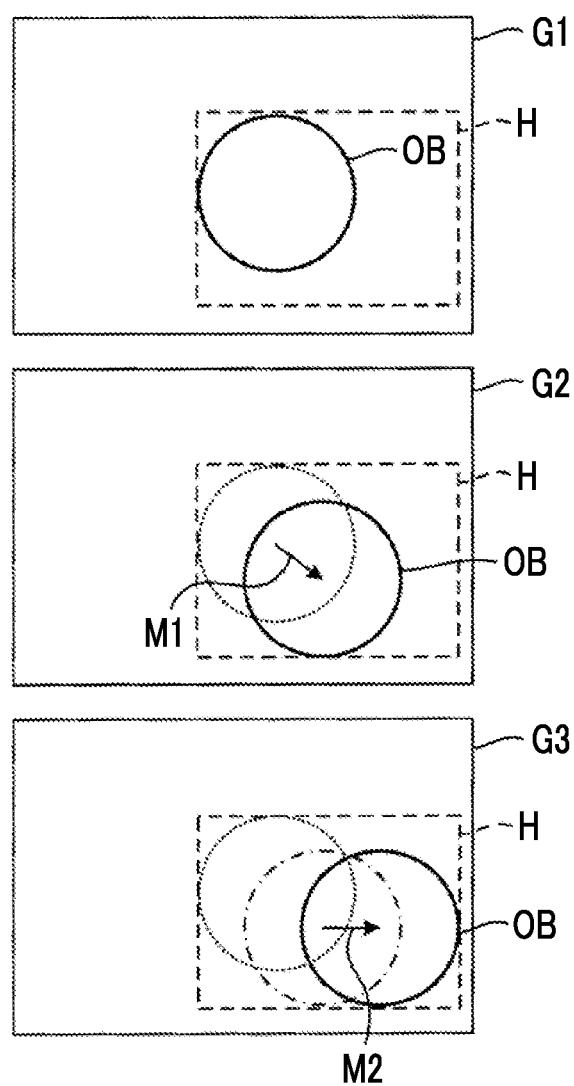
FIG. 2 is a diagram illustrating a method for calculating FPN corresponding to a moving range in an FPN calculation unit 19.

FIG. 2 is a diagram illustrating a method for calculating FPN corresponding to the moving range in the FPN calculation unit 19.

In FIG. 2, reference numerals G1, G2, and G3 indicate captured image data items obtained by sequentially capturing the image of an object including a moving body OB using the imaging element 3.

The moving body determination unit 18 compares the captured image data G1 with the captured image data G2 to detect the moving body OB. When the moving body OB is detected, it is possible to specify a moving range H of the moving body OB in the captured image data items G1, G2, and G3.

In FIG. 2, the position of the moving body OB in the captured image data G1 is represented by a dashed line in the captured image data G2. In addition, in the captured image data G3, the position of the moving body OB in the captured image data G1 is represented by a dashed line and the position of the moving body OB in the captured image data G2 is represented by a one-dot chain line.

The FPN calculation unit 19 specifies the moving range H of the moving body OB in each of the captured image data items G1, G2, and G3 on the basis of the trajectory of the moving body OB detected from the captured image data items G1, G2, and G3.

Specifically, a range including all of a region in which the moving body OB is present in the captured image data G3, a region in which the moving body OB is present in the captured image data G1, and a region in which the moving body OB is present in the captured image data G2 is the moving range H.

The FPN calculation unit 19 averages each pixel signal value in the moving range H in the captured image data G3, each pixel signal value in the moving range H in the captured image data G2, and each pixel signal value in the moving range H in the captured image data G1 to generate average image data.

The FPN calculation unit 19 stores the average image data as the FPN of the infrared detection pixels (the infrared detection pixels corresponding to the moving range H), which output each pixel signal value in the moving range H in the captured image data, in the main memory 16.

In the moving range H illustrated in FIG. 2, the position of the moving body OB changes randomly in each captured image data item. Therefore, when the pixel signal values in the moving range H in three captured image data items are averaged, signal components corresponding to the object are cancelled and reduced. Therefore, only the signal components corresponding to the FPN remain in the average image data. As a result, it is possible to use the average image data as the FPN.

In FIG. 2, an example in which the pixel signal values in the moving range H in three captured image data items are averaged has been described. However, the number of selected captured image data items to be subjected to the averaging process may increase to minimize the signal components corresponding to the object. Therefore, it is possible to use the average image data as FPN.

Figure 3:
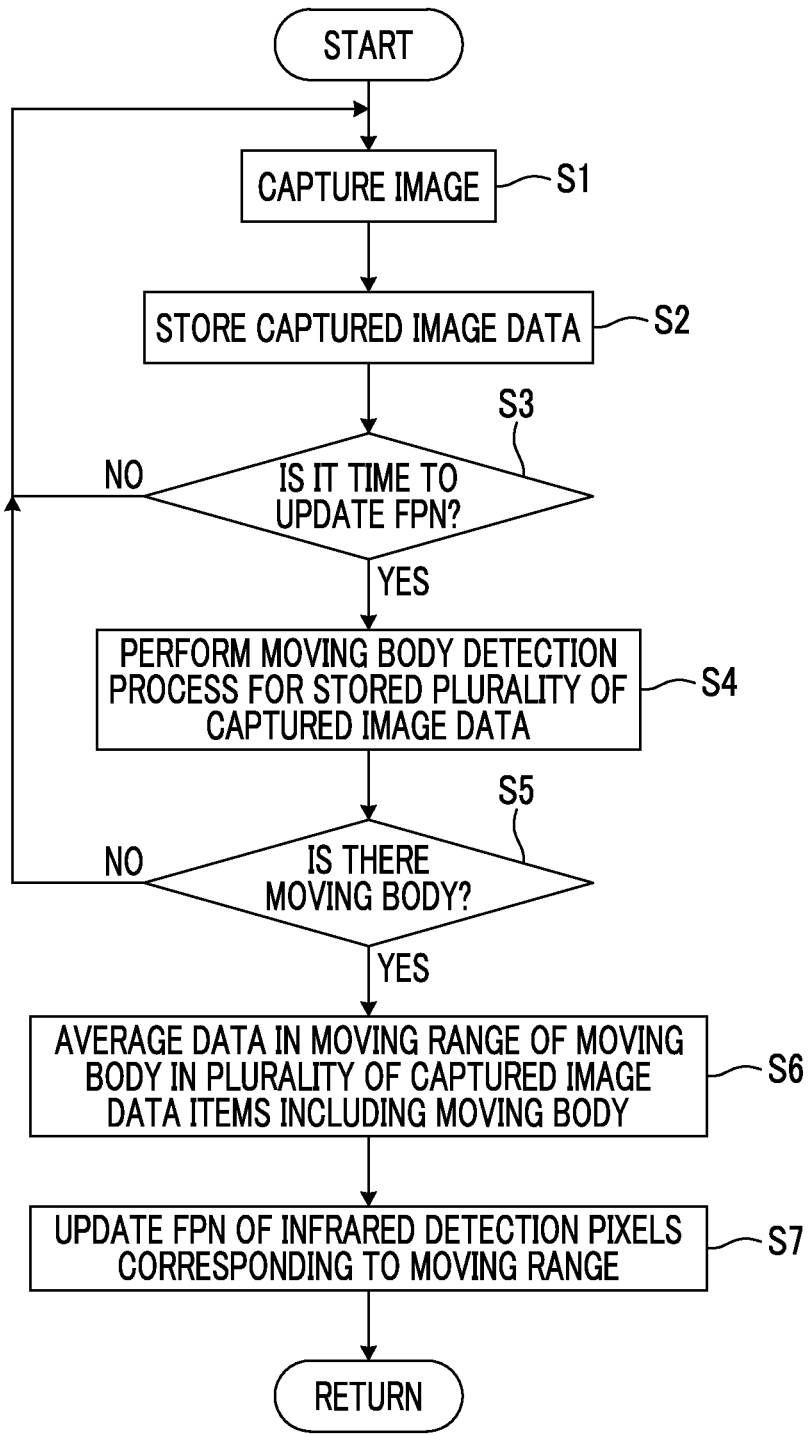
FIG. 3 is a flowchart illustrating an FPN calculation operation of the infrared imaging device illustrated in FIG. 1.

FIG. 3 is a flowchart illustrating an FPN calculation operation of the infrared imaging device illustrated in FIG. 1.

When the infrared imaging device is turned on, the system control unit 11 directs the imaging element 3 to start capturing a moving image of an object (Step S1).

When the capture of the moving image starts, the imaging element 3 outputs the captured image data and the captured image data is processed and stored in the main memory 16 (Step S2). For the captured image data stored in the main memory 16, the digital signal processing unit 17 performs, for example, an FPN correction process of subtracting the FPN stored in an FPN correction area and converts the captured image data into recording data. An image based on the recording data is displayed on the display unit 23 and the recording image data is recorded in the recording medium 21.

In the infrared imaging device illustrated in FIG. 1, for example, while the imaging element 3 is capturing a moving image, the imaging element 3 outputs 60 captured image data items per second. The main memory 16 can store 300 captured image data items. After 300 captured image data items are stored, the oldest captured image data is deleted and the latest captured image data is stored instead of the oldest captured image data.

When it is time to update the FPN stored in the FPN storage area of the main memory 16 (Step S3: YES), the moving body determination unit 18 performs a moving body detection process for a plurality of (=300) captured image data items which have been captured for a predetermined period of time (for example, 5 seconds) and then stored in the main memory 16 (Step S4).

The update time of the FPN stored in the FPN storage area of the main memory 16 is predetermined. Here, the update is performed every five seconds. In a case in which it is not time to update the FPN in Step S3, the process returns to Step S1.

In a case in which the moving body determination unit 18 detects a moving body using the moving body detection process in Step S4 (Step S5: YES), the FPN calculation unit 19 selects a plurality of captured image data items from a plurality of captured image data items including the moving body among the 300 captured image data items stored in the main memory 16. Here, the selected captured image data is referred to as selected captured image data. When the determination result in Step S5 is "NO", the process returns to Step S1.

The FPN calculation unit 19 averages the pixel signal values in the moving range of the moving body in each of the plurality of selected captured image data items to generate average image data (Step S6).

The FPN calculation unit 19 overwrites the average image data on the FPN of the infrared detection pixels corresponding to the moving range stored in the FPN storage area to update the FPN of the infrared detection pixels corresponding to the moving range (Step S7).

As described above, according to the infrared imaging device illustrated in FIG. 1, even while a moving image is being captured, it is possible to calculate the FPN without closing a shutter and changing the quality of the moving image. In addition, since the FPN is calculated by the average of a plurality of selected captured image data items, it is possible to apply the above-mentioned structure without any problem even while a moving image is being captured.

The FPN calculation unit 19 calculates the average of the plurality of selected captured image data items to generate FPN. Therefore, when an FPN correction process is performed for the captured image data using the generated FPN, it is possible to remove FPN other than high-frequency components and to improve the quality of a captured image.

In a case in which the infrared imaging device is provided in a vehicle, such as a car, when the vehicle starts to be moved, the entire object is a moving body. Therefore, the FPN of all of the infrared detection pixels of the imaging element 3 can be updated by the process described in FIG. 3.

For a plurality of captured image data items that include a moving body and have been obtained for the same period, in a case in which the moving body moves slightly, a small number of selected captured image data items are averaged to reduce signal components corresponding to the object.

Therefore, it is preferable that the FPN calculation unit 19 reduces the number of selected captured image data items, of which the average image data is to be calculated, as an integrated value of the amount of movement of the moving body in a plurality of captured image data items including the moving body which is stored in the main memory 16 increases.

In this case, the moving body determination unit 18 notifies the FPN calculation unit 19 of the motion vectors (reference numerals M1 and M2 in FIG. 2) of the moving body included in the plurality of captured image data items including the moving body.

The FPN calculation unit 19 calculates an integrated value of the magnitudes (corresponding to the amount of movement of the moving body) of a plurality of motion vectors calculated for the plurality of captured image data items including the moving body. Then, the FPN calculation unit 19 selects the number of selected captured image data items corresponding to the calculated integrated value from the captured image data items including the moving body and averages data in the moving range among the selected captured image data items to generate average image data.

In this way, it is possible to optimize the time required for FPN calculation and the amount of calculation, according to the state of the object to be captured.

Figure 4:
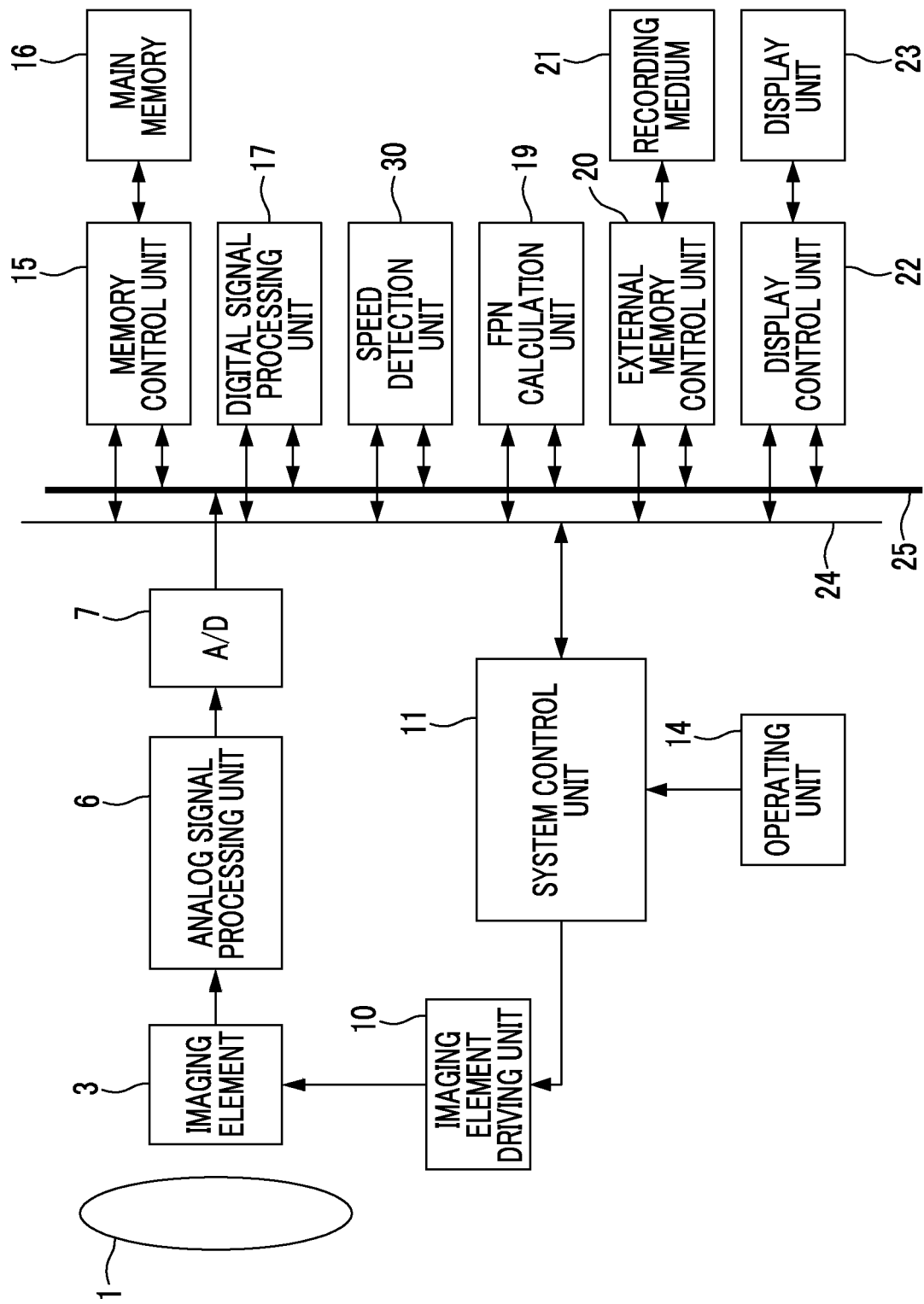
FIG. 4 is a diagram illustrating a modification example of the structure of the infrared imaging device illustrated in FIG. 1.

FIG. 4 is a diagram illustrating a modification example of the structure of the infrared imaging device illustrated in FIG. 1. It is assumed that the infrared imaging device illustrated in FIG. 4 is provided in a vehicle.

The infrared imaging device illustrated in FIG. 4 has the same structure as the infrared imaging device illustrated in FIG. 1 except that a speed detection unit 30 is provided instead of the moving body determination unit 18 and some of the functions of the FPN calculation unit 19 are changed.

The speed detection unit 30 detects the moving speed of the infrared imaging device. The speed detection unit 30 can detect the moving speed using a physical sensor, such as an acceleration sensor or a global positioning system (GPS) sensor provided in the infrared imaging device. Alternatively, the speed detection unit 30 may calculate the motion vector of a common object included in a plurality of captured image data items which are continuously obtained by the imaging element 3 and may detect the moving speed on the basis of the magnitude of the motion vector.

Figure 5:
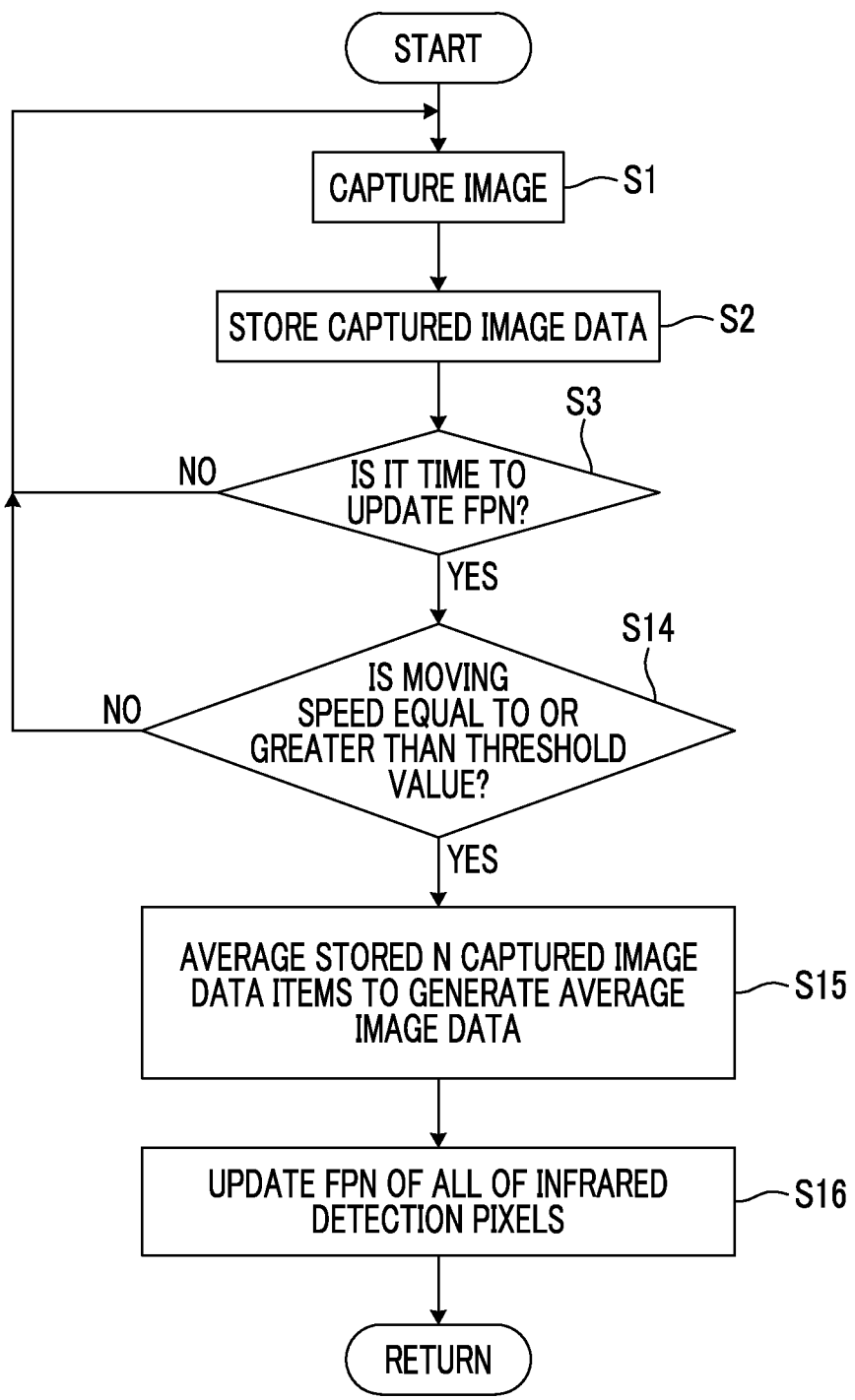
FIG. 5 is a flowchart illustrating an FPN calculation operation of the infrared imaging device illustrated in FIG. 4.

FIG. 5 is a flowchart illustrating an FPN calculation operation of the infrared imaging device illustrated in FIG. 4. In FIG. 5, the same steps as those illustrated in FIG. 3 are denoted by the same reference numerals and the description thereof will not be repeated.

When it is time to update FPN, the FPN calculation unit 19 acquires the moving speed detected by the speed detection unit 30 and determines whether the moving speed is equal to or greater than a threshold value TH1 (Step S14).

When the moving speed is less than the threshold value TH1, the process returns to Step S1. On the other hand, when the moving speed is equal to or greater than the threshold value TH1, the FPN calculation unit 19 selects N (N is a natural number equal to or greater than 2) captured image data items in reverse chronological order among 300 captured image data items stored in the main memory 16 as the selected captured image data items. Then, the FPN calculation unit 19 averages pixel signal values in the selected N captured image data items to generate average image data (Step S15).

Then, the FPN calculation unit 19 overwrites the average image data generated in Step S15 on the FPN of all of the infrared detection pixels stored in the FPN storage area to update the FPN (Step S16).

In a case in which the moving speed is equal to or greater than the threshold value TH1, that is, in a case in which the vehicle provided with the infrared imaging device is moved, the entire object is a moving body that moves with respect to the imaging element 3. Therefore, when the moving speed is equal to or greater than the threshold value TH1 at the update time of the FPN, N captured image data items in reverse chronological order which have been obtained before the time and then stored in the main memory 16 are captured image data items obtained by capturing the images of different objects. When the N captured image data items are averaged, the signal components corresponding to the object are cancelled and it is possible obtain average image data in which only FPN remains.

As such, according to the infrared imaging device illustrated in FIG. 4, in a case in which the moving speed of the infrared imaging device is equal to or greater than the threshold value TH1, the average of the pixel signal values in each of the past N captured image data items obtained by the imaging element 3 is calculated as the FPN of each infrared detection pixel. Therefore, similarly to the infrared imaging device illustrated in FIG. 1, it is possible to prevent the interruption of a moving image when the moving image is captured or a variation in the quality of a moving image.

In addition, a process of detecting a moving body from the captured image data is not required. Therefore, the infrared imaging device can more simply calculate the FPN than the infrared imaging device illustrated in FIG. 1.

When the threshold value TH1 is set to a very small value, there is no difference between the N selected captured image data items that are selected in Step S15 and the effect of cancelling the signal components corresponding to the object using averaging is reduced. Therefore, the threshold value TH1 is set to a sufficiently large value to obtain the cancellation effect.

The number of selected captured image data items N that are selected in Step S15 of FIG. 5 may be determined according to the magnitude of the moving speed determined in Step S14.

Figure 6:
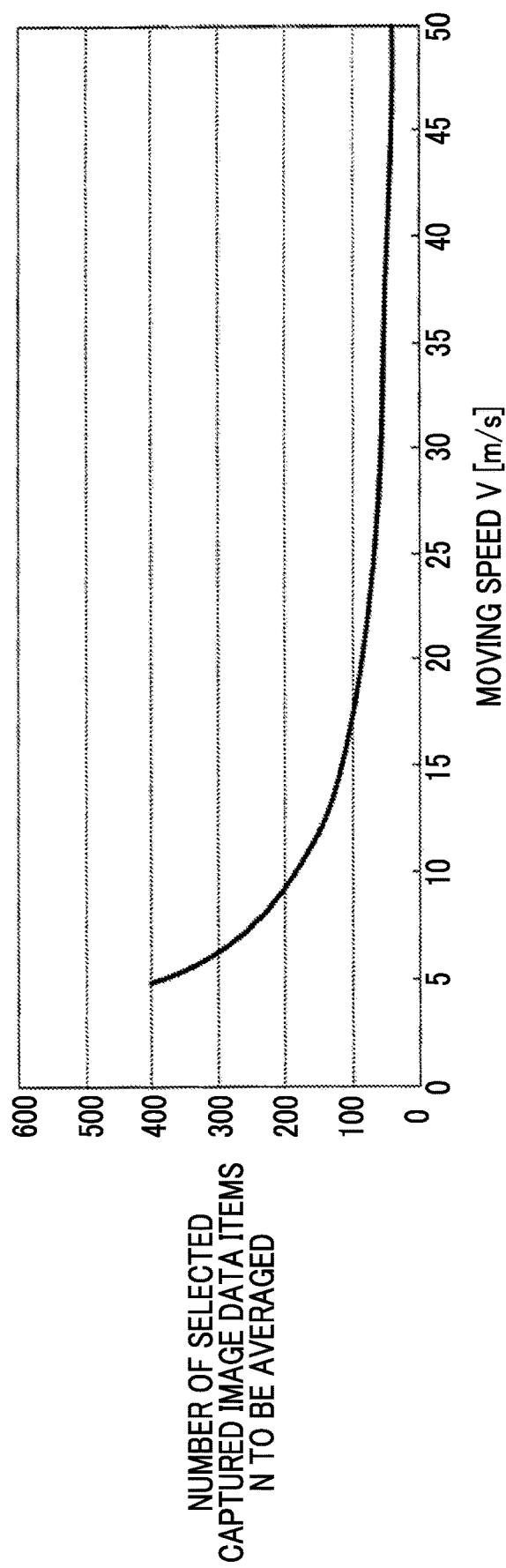
FIG. 6 is a diagram illustrating the relationship between the number of selected captured image data items N and a moving speed V.

FIG. 6 is a diagram illustrating the relationship between the number of selected captured image data items N and a moving speed V. In FIG. 6, the threshold value TH1 is 5 [m/s].

As illustrated in FIG. 6, as the moving speed V increases, the value of N decreases to reduce the amount of calculation required to calculate the FPN.

As described above, in the infrared imaging devices illustrated in FIGS. 1 and 4, a portion or whole of each of a plurality of selected captured image data items that are selected from a plurality of captured image data items obtained by capturing an object including a moving body that moves with respect to the imaging element 3 are averaged to obtain average image data and the average image data is stored as FPN.

When the same object (for example, the air) is included at the same coordinate position in a plurality of selected captured image data items to be averaged in Step S6 of FIG. 3 or Step S15 of FIG. 5, the pixel signal value of this portion in the average image data is likely to remain, without the cancellation of a signal component corresponding to the object.

Figure 7A:
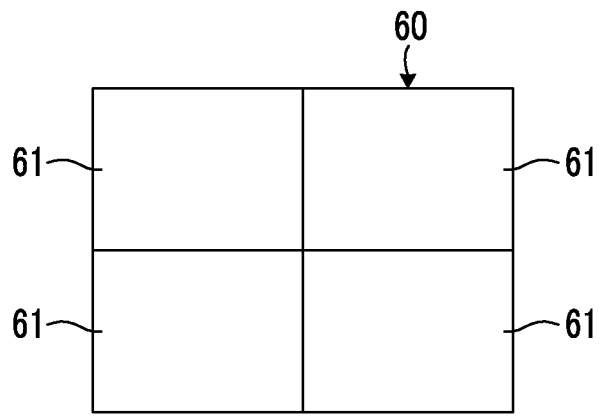
FIGS. 7A and 7B are diagrams illustrating a modification example of the FPN calculation method.
Figure 7B:
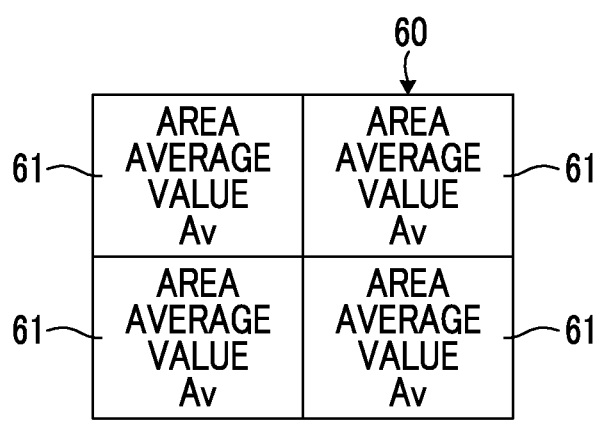

After generating the average image data, the FPN calculation unit 19 divides the average image data into a plurality of (four in FIG. 7A) areas 61, as illustrated in FIG. 7A. Reference numeral 60 indicates the average image data.

The FPN calculation unit 19 averages pixel signal values in the area 61 to calculate four area average values Av for each area 61. The FPN calculation unit 19 extracts a minimum value Min among the four area average values Av and replaces a pixel signal value which is equal to or greater than a threshold value TH2 among the pixel signal values of the average image data 60 with the minimum value Min to calculate final FPN.

Alternatively, after generating the average image data, the FPN calculation unit 19 extracts a minimum value among the pixel signal values of the average image data and replaces a pixel signal value which is equal to or greater than the threshold value TH2 among the pixel signal values of the average image data with the extracted minimum value to calculate final FPN.

According to this structure, in a case in which the digital signal processing unit 17 performs an FPN correction process of subtracting FPN from each pixel signal value of the captured image data, it is possible to prevent the pixel signal value corresponding to the air from being excessively small and to provide an image in which the shading of the object has been reflected.

The threshold value TH2 is set to a value that is sufficiently greater than a signal value generated as the fixed pattern noise. Therefore, in a case in which an object that does not move is present in a plurality of selected captured image data items, it is possible to improve the accuracy of calculating the FPN.

In addition, a program that causes a computer to perform each step performed by the FPN calculation unit 19 according to this embodiment may be provided. The program is recorded in a non-transitory computer-readable recording medium.

Examples of the "computer readable recording medium" include an optical medium, such as a compact disc-ROM (CD-ROM), or a magnetic recording medium, such as a memory card. In addition, the program may be provided by downloading through a network.

As described above, the specification discloses the following.

A disclosed infrared imaging device comprises: an imaging element including a plurality of infrared detection pixels which are two-dimensionally arranged; and a fixed pattern noise calculation unit that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels.

In the disclosed infrared imaging device, the fixed pattern noise calculation unit averages data in a moving range of the moving body in each of the plurality of selected captured image data items to generate the average image data and stores the average image data as the fixed pattern noise of the infrared detection pixels corresponding to the moving range.

In the disclosed infrared imaging device, the fixed pattern noise calculation unit calculates an integrated value of an amount of movement of the moving body included in the plurality of captured image data items and decreases the number of selected captured image data items as the integrated value increases.

In the disclosed infrared imaging device, the fixed pattern noise calculation unit stores average image data obtained by averaging whole of each of the plurality of selected captured image data items as the fixed pattern noise output from the plurality of infrared detection pixels.

The disclosed infrared imaging device further comprises a speed detection unit that detects a moving speed. The fixed pattern noise calculation unit decrease the number of selected captured image data items as the moving speed detected by the speed detection unit increases.

In the disclosed infrared imaging device, the fixed pattern noise calculation unit replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

A disclosed fixed pattern noise calculation method comprises a fixed pattern noise calculation step of selecting a plurality of selected captured image data items from a plurality of captured image data items obtained by capturing an image of an object including a moving body, which moves with respect to an imaging element including a plurality of infrared detection pixels that are two-dimensionally arranged, using the imaging element, averaging at least a portion of each of the plurality of selected captured image data items to generate average image data, and storing the average image data as fixed pattern noise which is output from at least some of the plurality of infrared detection pixels.

In the fixed pattern noise calculation step of the disclosed fixed pattern noise calculation method, data in a moving range of the moving body in each of the plurality of selected captured image data items is averaged to generate the average image data and the average image data is stored as the fixed pattern noise of the infrared detection pixels corresponding to the moving range.

In the fixed pattern noise calculation step of the disclosed fixed pattern noise calculation method, an integrated value of an amount of movement of the moving body included in the plurality of captured image data items is calculated and the number of selected captured image data items decreases as the integrated value increases.

In the fixed pattern noise calculation step of the disclosed fixed pattern noise calculation method, average image data obtained by averaging whole of each of the plurality of selected captured image data items is stored as the fixed pattern noise output from the plurality of infrared detection pixels.

In the fixed pattern noise calculation step of the disclosed fixed pattern noise calculation method, the number of selected captured image data items decreases as a moving speed of an infrared imaging device including the imaging element increases.

In the fixed pattern noise calculation step of the disclosed fixed pattern noise calculation method, a pixel signal value, which is equal to or greater than a threshold value, among pixel signal values forming the average image data is replaced with a minimum value among the pixel signal values of the average image data or a minimum value among average values of pixel signal values in each of a plurality of areas divided from the average image data to calculate the fixed pattern noise.

A disclosed fixed pattern noise calculation program causes a computer to perform a fixed pattern noise calculation step of selecting a plurality of selected captured image data items from a plurality of captured image data items obtained by capturing an image of an object including a moving body, which moves with respect to an imaging element including a plurality of infrared detection pixels that are two-dimensionally arranged, using the imaging element, averaging at least a portion of each of the plurality of selected captured image data items to generate average image data, and storing the average image data as fixed pattern noise which is output from at least some of the plurality of infrared detection pixels.

INDUSTRIAL APPLICABILITY

The invention is particularly applied to, for example, in-vehicle cameras and is convenient and effective.

The invention has been described in detail above with reference to a specific embodiment. However, it will be understood by those skilled in the art that various modifications and changes of the invention can be made without departing from the scope and spirit of the invention.

This application is based on 2014-199015 filed Sep. 29, 2014, the content of which is incorporated herein by reference.

EXPLANATION OF REFERENCES

3: imaging element
19: FPN calculation unit

What is claimed is:

1. An infrared imaging device comprising:
an imaging element including a plurality of infrared detection pixels which are two-dimensionally arranged; and
a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, and subtracts the fixed pattern noise from each pixel signal value of the captured image data items,
wherein the processor replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

2. An infrared imaging device, comprising:
an imaging element including a plurality of infrared detection pixels which are two-dimensionally arranged; and
a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, and subtracts the fixed pattern noise from each pixel signal value of the captured image data items,
wherein the processor averages data in a moving range of the moving body in each of the plurality of selected captured image data items to generate the average image data and stores the average image data as the fixed pattern noise of the infrared detection pixels corresponding to the moving range, and
wherein the processor calculates an integrated value of an amount of movement of the moving body included in the plurality of captured image data items and decreases number of the selected captured image data items as the integrated value increases.

3. The infrared imaging device according to claim 2,
wherein the processor replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

4. An infrared imaging device, comprising:
an imaging element including a plurality of infrared detection pixels which are two-dimensionally arranged;
a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, and subtracts the fixed pattern noise from each pixel signal value of the captured image data items,
wherein the processor stores average image data obtained by averaging whole of each of the plurality of selected captured image data items as the fixed pattern noise output from the plurality of infrared detection pixels; and
a speed detector that detects a moving speed,
wherein the processor decreases number of the selected captured image data items as the moving speed detected by the speed detector increases.

5. The infrared imaging device according to claim 4,
wherein the processor replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

6. An infrared imaging device, comprising:
an imaging element including a plurality of infrared detection pixels which are two-dimensionally arranged; and
a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, and subtracts the fixed pattern noise from each pixel signal value of the captured image data items,
wherein the processor averages data in a moving range of the moving body in each of the plurality of selected captured image data items to generate the average image data and stores the average image data as the fixed pattern noise of the infrared detection pixels corresponding to the moving range, and
wherein the processor replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

7. An infrared imaging device, comprising:
an imaging element including a plurality of infrared detection pixels which are two-dimensionally arranged; and
a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, and subtracts the fixed pattern noise from each pixel signal value of the captured image data items,
wherein the processor stores average image data obtained by averaging whole of each of the plurality of selected captured image data items as the fixed pattern noise output from the plurality of infrared detection pixels, and
wherein the processor replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

8. A fixed pattern noise calculation method comprising:
selecting a plurality of selected captured image data items from a plurality of captured image data items obtained by capturing an image of an object including a moving body, which moves with respect to an imaging element including a plurality of infrared detection pixels that are two-dimensionally arranged, using the imaging element,
averaging at least a portion of each of the plurality of selected captured image data items to generate average image data, and
storing the average image data as fixed pattern noise which is output from at least some of the plurality of infrared detection pixels, and subtracting the fixed pattern noise from each pixel signal value of the captured image data items,
wherein a pixel signal value, which is equal to or greater than a threshold value, among pixel signal values forming the average image data is replaced with a minimum value among the pixel signal values of the average image data or a minimum value among average values of pixel signal values in each of a plurality of areas divided from the average image data to calculate the fixed pattern noise.

9. A fixed pattern noise calculation method, comprising:
selecting a plurality of selected captured image data items from a plurality of captured image data items obtained by capturing an image of an object including a moving body, which moves with respect to an imaging element including a plurality of infrared detection pixels that are two-dimensionally arranged, using the imaging element,
averaging at least a portion of each of the plurality of selected captured image data items to generate average image data, and
storing the average image data as fixed pattern noise which is output from at least some of the plurality of infrared detection pixels, and subtracting the fixed pattern noise from each pixel signal value of the captured image data items,
wherein data in a moving range of the moving body in each of the plurality of selected captured image data items is averaged to generate the average image data and the average image data is stored as the fixed pattern noise of the infrared detection pixels corresponding to the moving range, and
wherein an integrated value of an amount of movement of the moving body included in the plurality of captured image data items is calculated and number of the selected captured image data items decreases as the integrated value increases.

10. The fixed pattern noise calculation method according to claim 9,
wherein a pixel signal value, which is equal to or greater than a threshold value, among pixel signal values forming the average image data is replaced with a minimum value among the pixel signal values of the average image data or a minimum value among average values of pixel signal values in each of a plurality of areas divided from the average image data to calculate the fixed pattern noise.

11. A fixed pattern noise calculation method, comprising:
selecting a plurality of selected captured image data items from a plurality of captured image data items obtained by capturing an image of an object including a moving body, which moves with respect to an imaging element including a plurality of infrared detection pixels that are two-dimensionally arranged, using the imaging element,
averaging at least a portion of each of the plurality of selected captured image data items to generate average image data, and
storing the average image data as fixed pattern noise which is output from at least some of the plurality of infrared detection pixels, and subtracting the fixed pattern noise from each pixel signal value of the captured image data items,
wherein average image data obtained by averaging whole of each of the plurality of selected captured image data items is stored as the fixed pattern noise output from the plurality of infrared detection pixels, and
wherein number of the selected captured image data items decreases as a moving speed of an infrared imaging device including the imaging element increases.

12. A fixed pattern noise calculation method, comprising:
selecting a plurality of selected captured image data items from a plurality of captured image data items obtained by capturing an image of an object including a moving body, which moves with respect to an imaging element including a plurality of infrared detection pixels that are two-dimensionally arranged, using the imaging element,
averaging at least a portion of each of the plurality of selected captured image data items to generate average image data, and
storing the average image data as fixed pattern noise which is output from at least some of the plurality of infrared detection pixels, and subtracting the fixed pattern noise from each pixel signal value of the captured image data items, wherein data in a moving range of the moving body in each of the plurality of selected captured image data items is averaged to generate the average image data and the average image data is stored as the fixed pattern noise of the infrared detection pixels corresponding to the moving range, wherein a pixel signal value, which is equal to or greater than a threshold value, among pixel signal values forming the average image data is replaced with a minimum value among the pixel signal values of the average image data or a minimum value among average values of pixel signal values in each of a plurality of areas divided from the average image data to calculate the fixed pattern noise.

13. A fixed pattern noise calculation method, comprising:

selecting a plurality of selected captured image data items from a plurality of captured image data items obtained by capturing an image of an object including a moving body, which moves with respect to an imaging element including a plurality of infrared detection pixels that are two-dimensionally arranged, using the imaging element, averaging at least a portion of each of the plurality of selected captured image data items to generate average image data, and storing the average image data as fixed pattern noise which is output from at least some of the plurality of infrared detection pixels, and subtracting the fixed pattern noise from each pixel signal value of the captured image data items, wherein average image data obtained by averaging whole of each of the plurality of selected captured image data items is stored as the fixed pattern noise output from the plurality of infrared detection pixels, and wherein a pixel signal value, which is equal to or greater than a threshold value, among pixel signal values forming the average image data is replaced with a minimum value among the pixel signal values of the average image data or a minimum value among average values of pixel signal values in each of a plurality of areas divided from the average image data to calculate the fixed pattern noise.

14. An infrared imaging device comprising:

an imaging element including a plurality of infrared detection pixels which are two-dimensionally arranged; and a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, wherein the processor averages data in a moving range of the moving body in each of the plurality of selected captured image data items to generate the average image data and stores the average image data as the fixed pattern noise of the infrared detection pixels corresponding to the moving range, and wherein the processor calculates an integrated value of an amount of movement of the moving body included in the plurality of captured image data items and decreases number of the selected captured image data items as the integrated value increases.

15. An infrared imaging device comprising:

an imaging element including a plurality of infrared detection pixels which are two-dimensionally arranged;

a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels; and a speed detector that detects a moving speed, wherein the processor stores average image data obtained by averaging whole of each of the plurality of selected captured image data items as the fixed pattern noise output from the plurality of infrared detection pixels, and wherein the processor decreases number of the selected captured image data items as the moving speed detected by the speed detector increases.

16. An infrared imaging device comprising:

an imaging element including a plurality of infrared detection pixels which are two-dimensionally arranged; and a processor that selects a plurality of selected captured image data items from a plurality of captured image data items obtained by capturing an image of an object including a moving body, which moves with respect to the imaging element, using the imaging element, averages at least a portion of each of the plurality of selected captured image data items to generate average image data, and stores the average image data as fixed pattern noise which is output from at least some of the plurality of infrared detection pixels, wherein the processor replaces a pixel signal value, which is equal to or greater than a threshold value, among pixel signal values forming the average image data with a minimum value among the pixel signal values of the average image data or a minimum value among average values of pixel signal values in each of a plurality of areas divided from the average image data to calculate the fixed pattern noise.

* * * * *